Patented Jan. 12, 1954

2,666,037

UNITED STATES PATENT OFFICE 2,666,037

REDUCING-SUGAR MODIFIED ANILINE-PHENOL-FORMALDEHYDE RESINS

Angelo P. Ingrassia, Laurel, Miss., assignor to Masonite Corporation, Laurel, Miss., a corporation of Delaware No Drawing. Application March 31, 1952, Serial No. 279,681

12 Claims. (Cl. 260—17.2)

The present invention relates to complex resinous compositions of the phenol-aldehyde type. It relates more particularly to resinous compositions prepared by the interaction of phenol, formaldehyde, a reactive amine, and a reducing sugar or mixture of reducing sugars. The invention includes the novel resinous compositions, the method of their manufacture and their use in the preparation of molded articles, hardboard manufacture, and the like uses.

Those skilled in the art of resinous composition manufacture have long been thoroughly familiar with the production of phenol-formaldehyde resins, and with the uses to which such compositions may be put. More recently, the art has developed resinous compositions having more extensive commercial utility than straight phenol-formaldehyde resins by incorporating therein a reactive amine of which aniline is perhaps the outstanding example. These three-component resins have derived particular utility from their increased plasticity.

It is an object of the present invention to increase the commercial desirability of phenol-formaldehyde-aniline resins by the chemical incorporation therein of sugars.

It is a further object of the invention to provide water-insoluble, thermosetting resinous compositions from the reaction of phenol, formaldehyde, aniline, and a reducing sugar or mixture of reducing sugars. Other objects of the invention will be apparent from the following detailed description thereof.

The invention derives its novelty from the unexpected discovery that a particular class of sugars may be chemically incorporated into aniline-phenol-formaldehyde resin compositions. One of the outstanding features of the invention stems from the discovery that the sugars must be reacted in a particular manner if the results obtained are to comprise more than a mere extension of the well known three-component resin.

Specifically, it has been found that certain types of sugars, namely, those containing a carbonyl group, are quite reactive with the replaceable hydrogen of aniline. The carbonyl group may be either aldose or ketose in nature, both of these types of sugars having been found to react satisfactorily. In a generic sense, therefore, the sugars which are applicable in the present invention are those which possess reducing properties, i. e., those which are capable of reducing freshly prepared Fehling's solution. Representative among the sugars which may be employed in the invention are glucose, xylose, levulose, maltose, mannose, galactose, arabinose, and the like reducing sugars. It has also been found that mixtures of these sugars may be employed, and another outstanding feature of the invention resides in the discovery that the oligosaccharide mixture obtained from thermohydrolytically treated lignocellulose is the most reactive of any of the reducing sugars which may be employed.

The preferred oligosaccharide mixture is derived from lignocellulose materials such as wood, woody plants, and various grasses. It consists principally of the water soluble portion of the product obtained by hydrolysis of the selected lignocellulose under high temperature and pressure as described, for example, in U. S. Patent No. 2,224,135, issued December 10, 1940, to Robert M. Boehm. The water solubles consist principally of pentosans and hexosans (about 60-80%), together with about 5-15% of non-sugar carbohydrates, 5-25% of lignin, and 2-8% of gums. Relatively concentrated aqueous solutions thereof, i. e. on the order of about 50% solids, are known in the trade as "Masonex." This oligosaccharide mixture is composed of mannose, arabinose, glucose, galactose, and xylose sugar units. Similar carbohydrate mixtures may also be obtained by the thermal hydrolysis of lignocellulose in the presence of mineral acids or by the saccharification of wood. Any of these sugar mixtures may be employed in the present invention. Another suitable carbohydrate mixture is that obtained by acid hydrolysis of the above described Masonex. This material is prepared by heating a relatively dilute aqueous solution of the wood sugars, i. e., 20-30% of sugar, in the presence of weak sulphuric acid. The product of the acid hydrolysis ordinarily contains from about 75% to about 90% or more of reducing sugars.

One of the advantages of the present invention is derived from the relatively high molecular weight of the sugar components. It has been found that the aniline and simple sugars are most favorably employed in the ratio of from about 0.5 to 1 mol of sugar for each mol of aniline Where the selected sugar composition is the oligosaccharide mixture obtained from thermohydrolitically treated lignocellulose, it will be apparent that, on a mol to mol basis, the weight of sugar employed is much greater than that of the aniline. This is due to the fact that the wood-sugar mixture has a molecular weight of more than 500 and the acid-hydrolyzed sugars have molecular weights in excess of 200. Thus, in employing Masonex as the selected sugar, from about 0.2–0.5 mol thereof per mol of aniline is ample while, in employing acid-hydrolyzed Masonex, from 0.2–1.0 mol of sugar per mol of aniline is most desirable. It will be evident that in this manner it is feasible to greatly increase the yield of resin through the use of a relatively large quantity of cheap starting material and this represents a decided commercial advantage.

Amounts of phenol and formaldehyde to be employed are not critical although best results have been obtained by using 1 to 2 mols of phenol to about 2 to 3 mols of formaldehyde. Although the condensation reaction may be carried out under superatmospheric conditions if desired, there is no particular advantage to be derived therefrom inasmuch as substantially complete polymerization is obtained by heating at atmospheric pressure.

In carrying out the preparation of the novel resinous compositions of the present invention, therefore, from 1 to 2 mols of phenol and from 2 to 3 mols of formaldehyde are mixed in a suitable reaction vessel preferably equipped with reflux condensing equipment. The reaction is more readily carried out in an alkaline medium and this may be obtained by making the mixture slightly alkaline, i. e. pH about 8–9, by the addition of a relatively small amount of an alkaline material such as an alkali metal or alkaline earth metal alkali, or an organic base including amines such as ethanolamine, diethanolamine, diethylethanolamine, and the like alkaline materials.

The phenol-formaldehyde mixture is heated and refluxed for about 30 minutes at which point condensation has progressed to the desired point. There is then added to the phenol-formaldehyde partial condensation product the product of reaction of aniline and sugar. This material is prepared by mixing together from about 0.2 to about 1 mol of the selected sugar and 1 mol of aniline. The reaction of the two components takes place either relatively instantaneously as in the case of Masonex and acid-hydrolyzed Masonex or, where a simple sugar is employed, by heating the mixture and allowing it to stand for a period up to two or three days at room temperature to complete the reaction. This reacted material, as has been previously stated, is added to the partially condensed phenol-formaldehyde mixture and the composite is refluxed for about an additional half hour. Thereafter water is removed by vacuum distillation and ordinarily the resinous product is removed from the reaction vessel when the temperature has reached about 100–110° C. In most instances the product will be a dark brown or black colored resin ranging in viscosity from relatively thick to a solid composition on cooling. The novel phenol-formaldehyde-aniline-sugar resins are insoluble in water, alkalis, acids, and most organic solvents. They have been found to be completely soluble in Methyl Cellosolve and at least partially soluble in other related organic solvents derived from ethylene glycol and the like substituted glycol compounds. The resins form tough, non-brittle films and may be used to advantage in various molding compositions, as resin glues, and in hardboard manufacture and the like uses where thermosetting resins have particular utility.

The following examples illustrate specific embodiments of the invention although it is to be understood that the invention is not limited thereto except as defined in the appended claims.

Example 1

26.7 parts of 88% phenol were mixed with 56.5 parts of 37% formalin and sufficient NaOH was added to make the mixture slightly alkaline (pH 8–9). The mixture was then heated and refluxed for one half hour, at which point there was added thereto a second mixture consisting of 46.5 parts of aniline and 75 parts of xylose in 75 parts of water. The composite mixture was refluxed for one half hour after which vacuum was applied to remove water. When the temperature had reached 100° C. (approximately 50 minutes later) the resinous product was removed from the reaction vessel. The liquid product was dark brown in color. A sample of the resin was cast in a film, and dried. It was insoluble in water, alkali, acids, and most organic solvents.

Example 2

93 parts of aniline were mixed with 180 parts of maltose in 180 parts of water together with sufficient acetic acid to dissolve the aniline. The mixture was allowed to stand for three days after heating to 60° C. in order to insure reaction between the two components.

47 parts of 88% phenol were mixed with 112.5 parts of 37% formalin and the mixture was made slightly alkaline by the addition of NaOH. The mixture was then heated and refluxed for one half hour at which point the reaction product of the aniline and maltose was added thereto and the composite was made alkaline by the addition of NaOH. This mixture was refluxed for one half hour after which vacuum was applied to remove water. After approximately 30 minutes the temperature had reached 105° C. and the resinous product was removed from the reaction vessel and dissolved in Methyl Cellosolve.

Example 3

46.4 parts of aniline were mixed with 90 parts of levulose together with sufficient acetic acid to dissolve the aniline. The mixture was heated to 60° C. and then stored for two days at room temperature.

27.5 parts of phenol were mixed with 56.5 parts of 37% formalin together with sufficient NaOH to make the mixture slightly alkaline. The mixture was then heated and refluxed for one half hour at which point the reaction product of the levulose and aniline was added thereto and the composite made alkaline by additional NaOH. The mixture was refluxed for one half hour after which vacuum was applied to remove water. When the temperature had reached 105° C., the resinous product was removed from the reaction vessel and dissolved in Methyl Cellosolve.

Example 4

The procedure of Example 3 was repeated except that 2 mols of D-glucose were employed instead of the levulose. The resin product was a hard yellowish-colored brittle material having a melting point somewhat in excess of 85° C. and easily capable of being ground to a fine powder.

Example 5

93 parts of aniline were mixed with 492.5 parts of acid-hydrolyzed Masonex (50% solids in aqueous solution) together with sufficient NaOH to make the mixture slightly alkaline.

TABLE 1

| Sample number | Blank | 1 | 2 | 3 | 4 | 5 | 6 |
|---|---|---|---|---|---|---|---|
| Molar ratio of resin reactants: | | | | | | | |
| Phenol | | 1 | 1 | 1 | 1 | 1 | 2 |
| Formaldehyde | | 3 | 3 | 3 | 3 | 3 | 3 |
| Aniline | | 2 | 2 | 2 | 2 | 2 | 1 |
| (1) Xylose | | 2 | | | | | |
| (2) Maltose | | | 1 | | | | |
| (3) Levulose | | | | 2 | | | |
| (4) D-glucose | | | | | 2 | | |
| (5) Hydrolyzed Masonex | | | | | | 2 | |
| (6) Hydrolyzed Masonex | | | | | | | 1 |
| Percent reducing sugar in resin, weight | | 44.9 | 49.4 | 49.4 | 49.4 | 54.6 | 37.7 |
| Percent volatiles in pellet | 4.0 | 4.0 | 5.4 | 2.7 | 4.0 | 2.5 | 4.0 |
| Specific gravity of pellet | 1.34 | 1.39 | 1.40 | 1.37 | 1.37 | 1.40 | 1.39 |
| M. O. R. in p. s. i. | 13,020 | 9,780 | 11,300 | 10,400 | 10,200 | 11,150 | 10,900 |
| Rockwell "M" scale hardness | 75 | 74 | 89 | 93 | 104 | 86 | 109 |
| Water absorption, percent uptake, 24 hours | 8.6 | 2.6 | 1.92 | 1.6 | 3.7 | 3.9 | 4.1 |
| 1% NaOH absorption, percent uptake, 24 hours | Disintegrated | 4.5 | 3.01 | 3.2 | 6.3 | 5.5 | 11.0 |

112.5 parts of 37% formalin were mixed with 47 parts of phenol together with 0.3 gram of NaOH. This mixture was heated and refluxed for one-half hour at which point the reaction product of the acid-hydrolyzed Masonex and aniline was added thereto. The mixture was refluxed for one-half hour after which vacuum was applied to remove water. When the temperature had reached 105° C. the resinous product was removed from the reaction vessel and dried in a vacuum oven until it was capable of being ground in a Wiley mill, i. e., did not soften at 85° C.

In the above example the acid hydrolyzed Masonex was prepared by heating in a copper lined kettle a 20% solution of Masonex in water together with sulphuric acid at a concentration of 3% based on the water present. Hydrolyzation was carried out over a three hour period at 208°–218° F. Calcium carbonate was added slowly over a period of 1.5 hours to neutralize the sulphuric acid. The product was then filtered and the hydrolyzed Masonex solution was concentrated to approximately 50% solids. The product contained 78.2% reducing sugars and had an approximate molecular weight, derived from this value, of 230.

Example 6

47 parts of aniline were mixed with 246.2 parts of hydrolyzed Masonex prepared as described above.

107 parts of 88% phenol were mixed with 112.5 parts of 37% formalin together with sufficient NaOH to make the mixture slightly alkaline. The reactants were then heated and refluxed for one-half hour at which point the reaction product of the acid-hydrolyzed Masonex and aniline was added thereto and the composite made alkaline by additional NaOH. The mixture was refluxed for one-half hour after which vacuum was applied to remove water. When the temperature had reached 107° C. the resinous product was removed from the reaction vessel, dried, and ground in a Wiley mill.

The resinous products of the above illustrative examples were dissolved in Methyl Cellosolve and mixed with hydrolyzed lignocellulose fiber in proportions of 50 parts of resin solids to 100 parts of fiber. After being air dried for several hours under forced air circulation, the volatiles of the mixture were reduced to about 5% and the material was ground in a Wiley mill. Thereafter the powder was molded into pellets employing a pressure of 2000 p. s. i. and 165° C. temperature. The molded objects were cooled to room temperature before being removed from the mold. Test results are tabulated below:

Experiments similar to those described in Examples 1–3 were carried out with sucrose and starch. Chemical and physical analyses of the products showed that no reaction had taken place between either the sucrose and aniline or between the starch and aniline.

Example 7

357 parts of Masonex (51.8% solids) were heated to 90° C. and 46 parts of aniline were added thereto.

107 parts of phenol were mixed with 112.5 parts of 37% formalin and sufficient NaOH was added to make the solution slightly alkaline. The phenol-formalin solution was then heated and refluxed for one-half hour at which point the reaction product of aniline and Masonex was added thereto. The refluxing was continued for an additional half hour and the reaction mixture was then cooled. Vacuum was applied at a temperature of about 68° C. to remove water. When the temperature reached 100° C. the resinous product was removed from the reaction vessel. The product was thereafter heated for 50 minutes at 105° C.

Example 8

47 parts of aniline were mixed with 246.2 parts of acid-hydrolyzed Masonex prepared as described above in connection with Example 5. 107 parts of phenol were mixed with 112.5 parts of 37% formalin and the solution was made alkaline by the addition of NaOH. The mixture was heated and refluxed for one half hour at which point the product of reaction of the aniline and Masonex was added and the refluxing continued for an additional half hour. Thereafter water was removed from the mixture under vacuum and the resinous product was removed from the reaction vessel when a temperature of 107° C. was reached.

The products of Examples 7 and 8 were employed as resin glue in the preparation of three-ply panels prepared from lignocellulose hardboard having specific gravities slightly in excess of 1.2. The resins were ground and dusted over the surfaces of the hardboards and fused thereto by melting under radiant heat. The three-ply panels were then laminated by pressing at 2000 p. s. i. pressure and at a temperature of 165° C. Tests results are given in the table below:

TABLE 2

|  | Sample number | |
| --- | --- | --- |
|  | 7 | 8 |
| Percent Masonex in resin based on total weight | 50 | 54.6 |
| Mol ratio of resin reactants: | | |
| Aniline | 1 | 2 |
| Phenol | 2 | 1 |
| Formaldehyde | 3 | 3 |
| Masonex | 0.3 | |
| Acid hydrolyzed Masonex | | 2 |
| M. O. R. in p. s. i | 12,950 | 13,125 |
| Bond strength (dry) | (¹) | (¹) |
| Bond strength (after 48 hours in H₂O) | (¹) | (¹) |

¹ Board failure.

The bond strength given in the table above is evaluated by pulling apart a sample of the panel by the application of force perpendicular to the surface thereof. A satisfactory bond is obtained when the sample pulls apart in one of the plies thereof while the glue line remains intact. In the above examples both samples had good bond strengths even after 48 hours immersion in water as evidenced by the fact that the panels delaminated in the plies thereof rather than in the glue lines. The term "M. O. R." means Modulus of Rupture expressed in pounds per square inch.

Pellets were prepared from the resins of Examples 7 and 8 in a manner similar to that described above in connection with Example 4. In all instances, the water and alkali absorption of the pellets was reduced materially.

From the foregoing discussion it will be seen that the novel resinous compositions of the present invention present commercially desirable advantages in their application as resin glues as well as in the preparation of molded articles, films, and the like uses. From the illustrative examples it will be noted that sugars, and particularly sugar mixtures obtained from hydrolyzed lignocellulose, may be used in amounts up to and greater than 50% of the total resin composition. In this manner, the present invention provides a method of greatly increasing the yield of phenol-formaldehyde-aniline resins through chemical substitution rather than by means of mere extension of the well known three-component resin.

I claim:

1. A resinous composition consisting essentially of the product of reaction of a partially condensed phenol-formaldehyde resin with the product of reaction of aniline and a reducing sugar.

2. A resinous composition consisting essentially of the product of reaction of a partially condensed phenol-formaldehyde resin with the product of reaction of aniline and a mixture of reducing sugars.

3. A resinous composition consisting essentially of the product of reaction of a partially condensed phenol-formaldehyde resin with the product of reaction of aniline and a mixture of reducing sugars, said sugar mixture consisting of the water-soluble material obtained by hydrolyzing lignocellulose at elevated temperatures and pressures in the presence of moisture.

4. A resinous composition consisting essentially of the product of reaction of a partially condensed phenol-formaldehyde resin with the product of reaction of aniline and an oligosaccharide mixture composed of arabinose, mannose, glacatose, and xylose sugar units.

5. A resinous composition consisting essentially of the product of reaction of a partially condensed phenol-formaldehyde resin with the product of reaction of aniline and a member of the group consisting of reducing monosaccharides and oligosaccharides composed of arabinose, mannose, galatose, glucose, and xylose sugar units.

6. A resinous composition consisting essentially of the product of reaction of a partially condensed phenol-formaldehyde resin with the product of reaction of aniline and a member of the group consisting of glucose, xylose, levulose, maltose, and an oligosaccharide mixture composed of arabinose, mannose, glacatose, glucose, and xylose sugar units.

7. A resinous composition as in claim 1 and wherein the reducing sugar is glucose.

8. A resinous composition as in claim 1 and wherein the reducing sugar is xylose.

9. A resinous composition as in claim 1 and wherein the reducing sugar is levulose.

10. A resinous composition as in claim 1 and wherein the reducing sugar is maltose.

11. A method of preparing a resinous composition which consists essentially of reacting together from about one to two mols of phenol and from about two to three mols of formaldehyde for a period of time sufficient to partially condense the reactants, reacting together from about one to two mols of aniline and from about 0.2 to 2 mols of a reducing sugar, and then mixing the two intermediate reaction products and heating them under elevated temperature conditions whereby there is obtained a water-insoluble, thermosetting, resinous composition.

12. A method of preparing a resinous composition which consists essentially of reacting together phenol and formaldehyde under mildly alkaline conditions for a period of time sufficient to partially condense the reactants, reacting together aniline and a reducing sugar under mildly acidic conditions for a period of time sufficient to partially condense the reactants, and then mixing the two intermediate reaction products and heating them under elevated temperature and mildly alkaline conditions whereby there is obtained a water-insoluble, thermosetting, resinous composition.

ANGELO P. INGRASSIA.

References Cited in the file of this patent

UNITED STATES PATENTS

| Number | Name | Date |
| --- | --- | --- |
| 1,593,342 | Meigs | July 20, 1926 |
| 1,868,215 | Meigs | July 19, 1932 |
| 2,151,883 | Adams | Mar. 28, 1939 |
| 2,362,086 | Myers | Nov. 7, 1944 |

FOREIGN PATENTS

| Number | Country | Date |
| --- | --- | --- |
| 274,146 | Great Britain | July 11, 1927 |